United States Patent Office 3,698,984
Patented Oct. 17, 1972

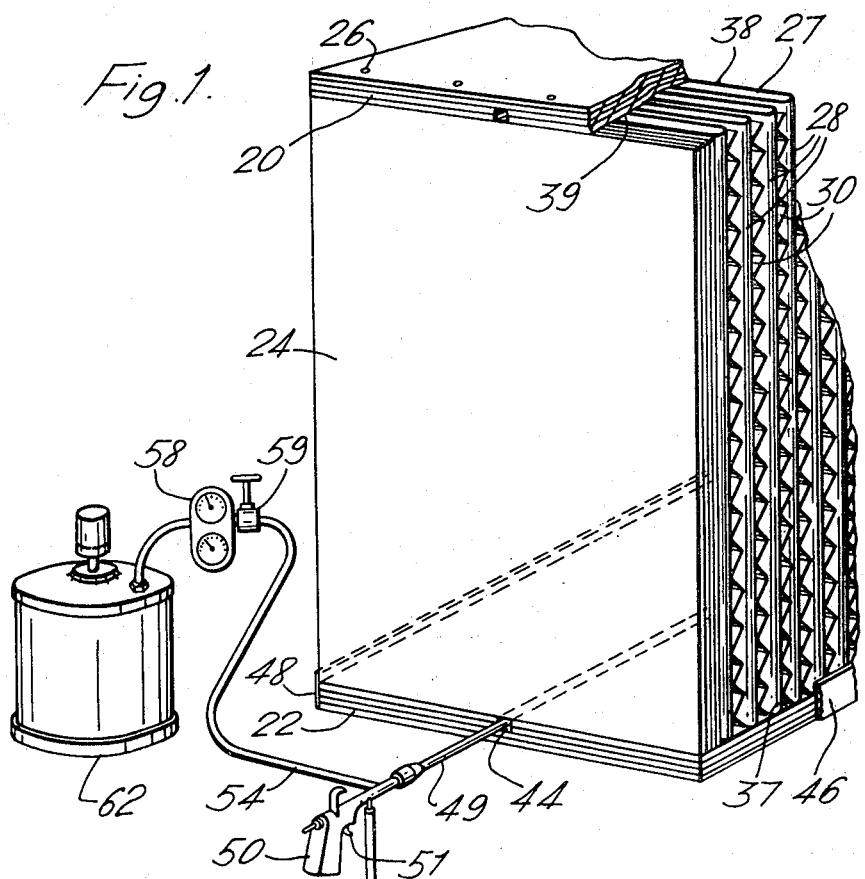
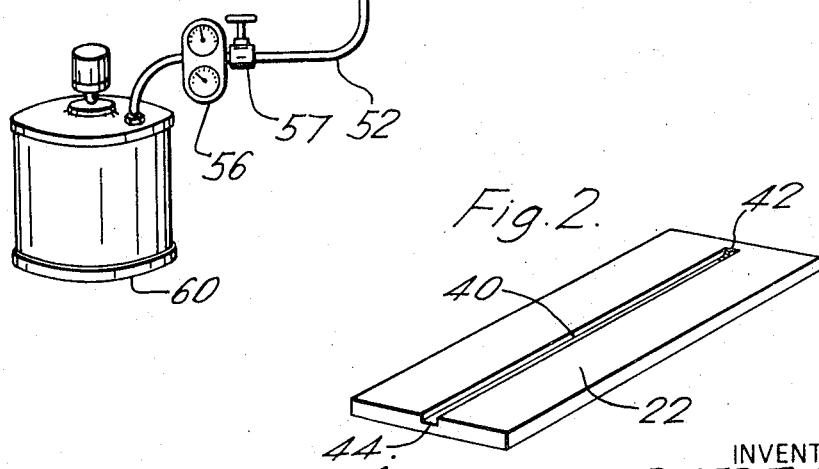

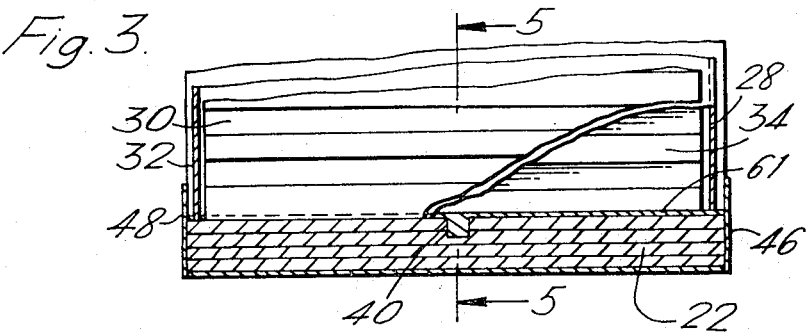
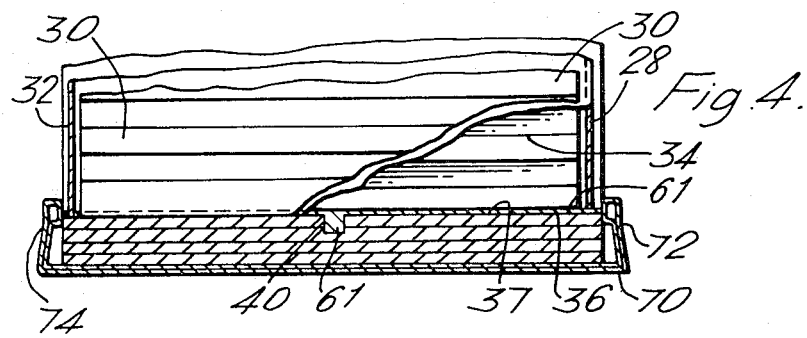
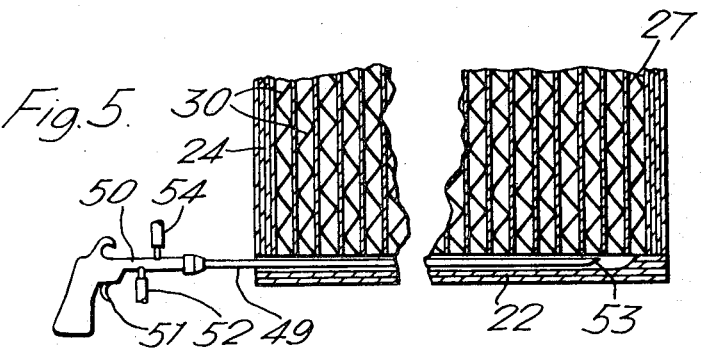
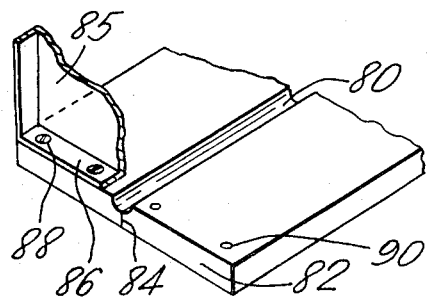

3,698,984
METHOD OF SEALING FILTER CORES TO FRAME MEMBERS
Roger T. Goulet, Liverpool, and Ernest R. Zednik, East Syracuse, N.Y., assignors to Cambridge Filter Corporation, Syracuse, N.Y.
Original application Apr. 8, 1968, Ser. No. 719,628. Divided and this application Apr. 2, 1970, Ser. No. 29,715
Int. Cl. B29c 19/00; B32b 31/00
U.S. Cl. 156—293                                7 Claims

ABSTRACT OF THE DISCLOSURE

Filter having a rectangular frame, the top and bottom frame members having a central groove on their inside face extending to at least one end of the top and bottom members, a filter core within the frame having a length of sheet filter media disposed in pleated formation within the frame, with the respective end edges of the media sealed to the frame end members, and the pleated side edges of the filter embedded in a slab of sealant extending across the inside faces of each of the top and bottom frame members and filling the grooves of said top and bottom members and the method of injecting the sealant in liquid form by means of the groove.

---

This application is a division of application 719,628, filed Apr. 8, 1968, now Pat. No. 3,581,479, granted June 1, 1971.

This invention relates to space filters, and more particularly to high efficiency filters wherein a core of pleated filter media is mounted within a rectangular frame.

In filters of the type referred to, the filter core comprises an extended sheet of filter media formed into a series of pleats, into the folds of which corrugated spacers extend. When such a core is mounted within its supporting frame, the entire media edge, both ends, and pleat edges must be continuously sealed to the frame to avoid bypass. The deep pleats have sinuous edges of considerable length that require sealing along the entire length. Various plastic sealing materials such as rubber base adhesives, have been employed in an effort to effect a seal. However, the extended length of the edges required to be sealed to the inside surface of the frame has resulted in a tedious time consuming operation involving coating the edges and inside frame surfaces prior to assembly and allowing the sealant to harden after assembly of the core in the frame.

In an application filed Dec. 5, 1966, Ser. No. 599,276 there is disclosed a method of providing a seal by pouring a sealant into a temporary trough into which one side of the filter frame is placed, the sealant flowing inwardly from the side edges to form a slab of sealant adhesively bound to the inside surface of the frame and in which the sinuous edge of the filter media becomes embedded.

The present invention is an improved method of applying the sealant which comprises injecting the sealant into the center of the filter frame so the sealant may flow outwardly over the inside surface of the frame member to the side edges of the frame member.

More particularly the invention contemplates providing a long groove, on the inside face of each of the opposed frame members, extending inwardly from one end along the approximate center line to a point just short of the other end. The groove lying beneath the filter media pack and the center of the sinusoidal filter media flanks, serves as a means for inserting a long slender tube into the groove beneath the filter pack. By supplying the tube with liquid sealant or adhesive and slowly withdrawing the tube, the liquid sealant is discharged from the tube end and caused to flow outwardly from the groove, puddle like, toward the side edges of the frame member, the sealant immersing the edges of the filter media, and forming an embedding slab bonded to the frame upon hardening. Any suitable temporary dam along the side edges of a height of a fraction of an inch may temporarily serve to allow the sealant to spread and build up to a depth of an eighth of an inch or more before solidification takes place without spilling over the side edge.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like characters indicate like parts:

FIG. 1 is a perspective fragmentary view of a filter with apparatus schematically indicated for applying the sealant;

FIG. 2 is a perspective view of a bottom or top casing member grooved to facilitate the treatment;

FIG. 3 is a sectional view through the filter showing the groove, and one form of side wall dam;

FIG. 4 is a sectional view through the filter set in a channel the flanges of which provide a temporary dam;

FIG. 5 is a fragmentary sectional view through a filter showing the supply tube in active position for supplying sealant on being withdrawn; and FIG. 6 is a fragmentary view of a sheet metal frame member and an end member provided with a groove to serve the purposes of the invention.

Referring to FIG. 1 there is shown a filter having top and bottom frame members 20 and 22 and a connecting end member 24, all of plywood, and which may be nailed, screwed or otherwise secured together as is indicated at 26. Within the frame is disposed the filter pack which comprises an elongated sheet of filter media 27 arranged in a series of pleats, the pleat folds at one side being indicated at 28, the pleats being separated by corrugated separators, inserted alternately from opposite sides to space the adjacent flanks of the pleats. As shown, spacers 30 and 30 are inserted within folds 32 and 32 in the media from one side and spacers 34 (see FIG. 4) extend inwardly within and to the media folds 28 from the other side. Thus it will be seen that the lower edge 36, and the upper edge 38 of the media adjacent to the inside surfaces 37 and 39 of the lower frame member 22 and upper frame member 20 must be sealed along their entire edges to the lower and upper frame members respectively in order to assure against leakage or by-pass. In a filter having a depth of twelve inches, the lower or upper edge seal that must be effected has to extend along the pleated edge for a distance of about two feet for each pleat.

In order to effect a seal quickly and absolutely free of leakage or by-pass, the top and bottom frame members are provided with a central longitudinal groove 40 such as that shown in FIG. 2. Such groove in a ¾ inch plywood slab, may be about 5/16 inch deep and wide and extend from one end to a point about three fourths of an inch short of the other end, as at 42. Such a frame member, when employed in a filter frame, will have the groove end 44 exposed as indicated in FIG. 1.

Upon the assembly of a filter frame about a filter core, the filter is set upon a level support. To provide a temporary dam, adhesive tapes 46 and 48 are applied along the sides as indicated in FIGS. 1 and 3. Thereafter a long slender tube 49 connected to the grip of control gun 50 is inserted full into the groove to the far end. Such gun having a trigger valve 51 is provided with two connections 52 and 54 each leading to a gear pump and 56 and 58 respectively and sources of supply 60 and 62. The sources of supply may comprise the two components, such as a liquid resin, and liquid polyamide or amine as a hardener. The mixture may comprise about 50% resin, and hardener comprising 10% plasticizer and 40% amide. The gear pumps serve to provide a rate of delivery and to maintain a proper ratio, which may be one to one. When resin and amide are employed, they are separately heated to about 150 degrees. As they mix and progress down the tube, heat is generated, and the mixture is discharged at the open end of the tube where the mixture puddles and flows outwardly over the inside surface of the frame member to the side edges. By gradually withdrawing the tube as a sufficient quantity of the sealant 61 appears at the side edges, a quantity of sealant so as to result in an even level of sealant about an eighth to three sixteenths of an inch thick is dispersed over the entire upper inner surface of the bottom member. As the end of the gun is withdrawn from the end of the groove 44, the supply is cut off and a wood plug or other seal is placed in the exposed end of the groove. Thereafter the process may be repeated in conjunction with the next filter. When the sealant has set on the inner surface of the bottom member of a filter, it may be inverted for further treatment. When inverted for further treatment, adhesive tapes 46 and 48 are applied along the edges to provide a dam to confine the puddling, and prevent flow over the edges and thus assure the application of a relatively uniform thick layer across the entire width of the member to embed the sinuous edge of the filter medium in the sealant along its entire lineal length.

To permit the introduction of sealant into the groove, from which it overflows and spreads out without turbulence in the region of discharge, the end of the tube is preferably cut at an angle as shown at 53 so as to provide a wide oval inclined opening. This reduces the velocity at discharge, and by facing the opening downwardly into the groove, the groove tends to prevent or obstruct any jet effect, and provide an overflow effect avoiding turbulence.

Where a substantial number of filter assemblies are produced so that one end of each assembly can be provided with the sealant in rapid succession, the delay between removing the tube from one filter and reinserting it into the next is insignificant, and where a large number of filter assemblies are to be treated, the filters having one side sealed may be recirculated after setting and then inverted and the opposite side treated.

While tapes have been referred to as effective to prevent spillage over the edges during the leveling out of the sealant and the solidifying thereof, a pan-like structure 70 having resilient flanges 72 and 74 may be employed as indicated in FIG. 4, such pan being removed from the filter when hardening is effected. The pan may be lined with flexible sheet mold release material such as Teflon, which subsequently can be heated before reuse to peel off any hardened sealant that may remain on the liner.

In some filters, the frame may comprise sheet metal members, as for example appears in U.S. Pat. #2,884,091. In such filters the top and bottom members may have a central groove formed therein, as is indicated in FIG. 6, as at 80. In such case the forming of the groove may require the interruption of the end flange 82 as at 84. The interruption may be welded, or not, since transverse stiffness of the member may be supplied by the angle iron and flange stiffening effect of the side member, as indicated in FIG. 6, the side member 85 having a flange 86 that is rigidly secured to the top or bottom members as by a series of bolts 88 in apertures 90, or by other suitable means. Where a metal plate is employed it may be desirable to preheat or insulate the underside prior to and during the application of the sealant. It will be understood that the groove will be sealed by a plug at the end opposite from that into which the injector tube is inserted, prior to the treatment.

The sealant described has a low viscosity of about 50 centipoises and is comparable to light cream when fed into the groove and overflowing therefrom. The sealant also tends to wet the filter material and has a low shrinkage characteristics. The sealant also has a low odor level, and is preferably non-flammable.

While a particular sealant has been described, the method can be carried out with an adhesive of the one component solvent release type, or a two component polyurethane 100 to 1 ratio at room temperature, or almost any low viscosity adhesive. Also while a tube with an outlet at the end has been referred to as effective to supply the sealant, the groove could be covered with a permeable sheet of material, and the groove act as the conduct for introducing the sealant along the entire length thereof. In addition a perforate tube disposed in the groove which may be left in the filter can be used to distribute the sealant.

While temporary dams of tape or the like have been referred to, the top and bottom frame members could be provided with permanent side flanges of a height to serve the purpose.

While a single form and variations of the invention have been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. The method of sealing a relatively deep pleated filter core to one member of a frame which comprises supplying the frame member with a central groove on its inside surface extending substantially the length thereof, injecting sealant by a supply tube along the length of said groove in sufficient quantity to form a puddle of sealant leveling out to a thin slab of sealant bonded to the inside surface of the frame member and embedding the pleated filter core adjacent the frame member in said sealant, and plugging up the end of the central groove on withdrawal of the supply tube from the groove.

2. The method according to claim 1 wherein prior to injecting sealant, the side edges of the frame member are provided with temporary flanges to prevent spillage of the sealant over the side edges.

3. The method according to claim 2 wherein the temporary flanges comprise adhesive tapes.

4. The method according to claim 1 wherein immediately on the withdrawal of the tube from the groove, the groove end is plugged.

5. The method according to claim 1 wherein the frame has a second frame member opposite to the one frame member and such second frame member is also provided with a central groove, and on completion of injection of the sealant upon the inside surface of the one frame member, the sealant is allowed to harden and cool, and thereafter the filter core and frame are inverted, and sealant injected into the groove of the second frame member.

6. The method according to claim 1 wherein the sealant comprises epoxy and an amide and are delivered to the tube from separate sources in approximately one to one ratio.

7. The method according to claim 1 wherein the discharge end of the tube is provided with a downwardly facing opening to direct the sealant downwardly into the groove.

References Cited

UNITED STATES PATENTS

| 3,242,656 | 3/1966 | Murphy | 210—493 X |
| 3,334,395 | 8/1967 | Cook et al. | 156—293 X |
| 3,563,828 | 2/1971 | Marshall | 156—293 X |

CARL D. QUARFORTH, Primary Examiner

P. A. NELSON, Assistant Examiner

U.S. Cl. X.R.

156—330, 257; 55—524, 528